US012798663B2

(12) United States Patent
Abuaita et al.

(10) Patent No.: US 12,798,663 B2
(45) Date of Patent: Nov. 17, 2026

(54) ACTIVE REAR STEERING POWER CONSUMPTION MANAGEMENT

(71) Applicant: GM GLOBAL TECHNOLOGY OPERATIONS LLC, Detroit, MI (US)

(72) Inventors: Raed N. Abuaita, Fenton, MI (US); Jason W. Gaydos, Waterford, MI (US); Brian K. Saylor, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 19/010,460

(22) Filed: Jan. 6, 2025

(65) Prior Publication Data

US 2026/0192852 A1 Jul. 9, 2026

(51) Int. Cl.
*B62D 5/04* (2006.01)
*B62D 7/15* (2006.01)

(52) U.S. Cl.
CPC ........... *B62D 5/046* (2013.01); *B62D 5/0463* (2013.01); *B62D 5/0481* (2013.01); *B62D 5/0484* (2013.01); *B62D 7/1545* (2013.01)

(58) Field of Classification Search
CPC .... B62D 5/0484; B62D 5/046; B62D 5/0463; B62D 5/0481
USPC ...................................................... 701/41–43
See application file for complete search history.

(56) References Cited

U.S. PATENT DOCUMENTS

| | | | | |
|---|---|---|---|---|
| 4,756,375 A * | 7/1988 | Ishikura | B62D 5/0478 | 180/404 |
| 5,014,801 A * | 5/1991 | Hirose | B62D 7/1581 | 701/43 |
| 5,417,299 A * | 5/1995 | Pillar | B62D 7/1509 | 280/426 |
| 5,508,921 A * | 4/1996 | Chikuma | B62D 7/1581 | 701/41 |
| 5,758,741 A * | 6/1998 | Tomioka | B62D 5/065 | 701/41 |
| 6,397,969 B1 * | 6/2002 | Kasai | B62D 5/049 | 180/404 |
| 6,949,901 B1 * | 9/2005 | Collier-Hallman | B62D 6/002 | 318/434 |

(Continued)

FOREIGN PATENT DOCUMENTS

| | | |
|---|---|---|
| DE | 3619703 C2 | 1/1987 |
| DE | 10117059 A1 | 5/2006 |

(Continued)

*Primary Examiner* — Logan M Kraft
*Assistant Examiner* — Brian R Kirby
(74) *Attorney, Agent, or Firm* — Quinn IP Law

(57) ABSTRACT

A system and method for power management in an active rear steering system in a vehicle is presented. The system and method include determining a state of charge of a vehicle battery based on a voltage level of the vehicle battery where a full performance level of the active rear steering system is enabled when the voltage level of the vehicle battery is greater than a first threshold level. However, the full performance level of the active rear steering system may be degraded to a reduced performance level when the voltage level of the vehicle battery is less than the first threshold level but greater than a second threshold level. And, the performance level of the active rear steering system may be disabled when the voltage level of the vehicle battery is less than the second threshold level.

20 Claims, 9 Drawing Sheets

100

(56) References Cited

U.S. PATENT DOCUMENTS

| | | | | | |
|---|---|---|---|---|---|
| 8,140,280 | B2 * | 3/2012 | Kasai | B62D 5/0481 | 702/182 |
| 8,504,247 | B2 * | 8/2013 | Yamashita | B62D 5/0481 | 180/443 |
| 8,989,965 | B2 * | 3/2015 | Abe | B62D 5/0481 | 701/41 |
| 9,604,666 | B2 * | 3/2017 | Nakayama | B62D 5/0463 | |
| 10,166,985 | B2 * | 1/2019 | Krueger | B60W 30/146 | |
| 11,104,376 | B1 * | 8/2021 | Miki | B62D 5/0463 | |
| 11,104,377 | B1 * | 8/2021 | Shibata | B62D 5/0463 | |
| 12,116,051 | B2 * | 10/2024 | Kakas | B62D 5/003 | |
| 2005/0269151 | A1 * | 12/2005 | Miyaura | B62D 5/0481 | 180/446 |
| 2006/0001392 | A1 * | 1/2006 | Ajima | H02P 6/10 | 318/432 |
| 2006/0181819 | A1 * | 8/2006 | Nomura | B62D 5/0487 | 361/31 |
| 2007/0043490 | A1 * | 2/2007 | Yokota | B62D 5/0463 | 701/41 |
| 2008/0035411 | A1 * | 2/2008 | Yamashita | B62D 5/046 | 180/443 |
| 2008/0201041 | A1 * | 8/2008 | Jiang | H02P 21/04 | 318/632 |
| 2009/0259419 | A1 * | 10/2009 | Kasai | B62D 5/0481 | 324/426 |
| 2011/0040450 | A1 * | 2/2011 | Izutani | B62D 5/0481 | 701/43 |
| 2011/0048840 | A1 * | 3/2011 | Gagnon | B62D 6/007 | 701/41 |
| 2013/0041557 | A1 * | 2/2013 | Endo | B62D 6/002 | 701/42 |
| 2013/0218403 | A1 * | 8/2013 | Abe | B62D 5/0481 | 701/32.8 |
| 2015/0248132 | A1 * | 9/2015 | Lee | B60W 30/10 | 701/23 |
| 2019/0176873 | A1 * | 6/2019 | Lin | B62D 5/0463 | |
| 2020/0031385 | A1 * | 1/2020 | Kezobo | B62D 6/00 | |
| 2023/0174053 | A1 * | 6/2023 | Kouno | B60W 10/20 | |

FOREIGN PATENT DOCUMENTS

| | | | |
|---|---|---|---|
| DE | 112005001896 | T5 | 5/2007 |
| DE | 602005001975 | T2 | 5/2008 |

* cited by examiner

500

| Inputs to ARS | | | ARS Output Performance | | | |
|---|---|---|---|---|---|---|
| Voltage | Voltage Gradient | Rear Rack Force | Jerk | Accel. | Velocity | Displacement |
| Nominal | Nominal | Any | Normal | Normal | Normal | Max |
| Low | Decreasing | Low | Reduced | Normal | Normal | Max |
| Low | Decreasing | Normal | Reduced | Reduced | Normal | Max |
| Low | Decreasing | High | Reduced | Reduced | Reduced | Reduced |
| Under Voltage | Decreasing | Any | Zero | Zero | Zero | Zero |

FIG. 5

ACTIVE REAR STEERING POWER CONSUMPTION MANAGEMENT

INTRODUCTION

Vehicles are a staple of everyday life. Special use cameras, microcontrollers, laser technologies, and sensors may be used in many different applications in a vehicle. Cameras, microcontrollers, and sensors may be utilized in enhancing automated structures that offer state-of-the-art experience and services to the customers, for example in tasks such as body control, active rear steering control, camera vision, information display, security, autonomous controls, etc. Further, vehicle operations may be controlled to extend or increase efficiency resulting in greater performance or economies.

Vehicles may use multiple sensors to monitor various functions and levels within a vehicle, including battery state of charge. In some vehicle models, for example a battery electric vehicle, a plug-in hybrid vehicle, or a hybrid electric vehicle, where battery energy may be used for numerous functions, including electric drive motors, the use of battery power across functions is critical to the operation of the vehicle.

Accordingly, it is desirable to provide power management in a vehicle, especially a vehicle equipped with active rear steering.

SUMMARY

Disclosed herein are systems and methods for power management in an active rear steering system in a vehicle. A method for power management in an active rear steering system in a vehicle may include determining a state of charge of a vehicle battery based on a voltage level of the vehicle battery and further including enabling a full performance level of the active rear steering system when the voltage level of the vehicle battery is greater than a first threshold level. The method may also include degrading the full performance level of the active rear steering system to a reduced performance level of the active rear steering system when the voltage level of the vehicle battery is less than the first threshold level but greater than a second threshold level and then disabling the performance level of the active rear steering system when the voltage level of the vehicle battery is less than the second threshold level.

Another aspect of the disclosure may be a method further including determining a voltage level of the vehicle battery, a voltage gradient level of the vehicle battery, and a rear rack force of the active rear steering system to determine a level of the reduced performance level of the active rear steering system.

Another aspect of the disclosure may be a method where the reduced performance level of the active rear steering system is determined by an output performance level of the active rear steering system that includes a jerk component level, an acceleration component level, a velocity component level, and a rear rack displacement component level.

Another aspect of the disclosure may be a method where when the voltage level of the vehicle battery is less than the first threshold level, and the voltage gradient is decreasing, and the rear rack force is less than a first rear rack force threshold level, then the jerk component level is reduced.

Another aspect of the disclosure may be a method where when the voltage level of the vehicle battery is less than the first threshold level, and the voltage gradient is decreasing, and the rear rack force is greater than a second rear rack force threshold level but less than a third rear rack force threshold, then the jerk component level is reduced and the acceleration component level is reduced.

Another aspect of the disclosure may be a method where when the voltage level of the vehicle battery is less than the first threshold level, and the voltage gradient is decreasing, and the rear rack force is greater than a third rear rack force threshold level, then the jerk component level is reduced and the acceleration component level is reduced and the velocity component level is reduced and the displacement component level is reduced.

Another aspect of the disclosure may be a method where when the voltage level of the vehicle battery is less than the second threshold level, then the jerk component level is set to zero and the acceleration component level is set to zero and the velocity component level is set to zero and the displacement component level is set to zero.

Another aspect of the disclosure may be a method where the degrading of the full performance level of the active rear steering system to the reduced performance level comprises utilizing a controller to limit commands to output an S-curve motion profile to a rear steering motor.

Another aspect of the disclosure may be a method where the reduced performance level of the active rear steering system comprises a linear reduction of gain to a jerk component level, an acceleration component level, a velocity component level, and a rear rack displacement component level.

Another aspect of the disclosure may be a method where the reduced performance level of the active rear steering system comprises a linear reduction of a torque command gain.

Another aspect of the disclosure may be a method where the reduced performance level of the active rear steering system comprises a linear reduction of a torque maximum.

Another aspect of the disclosure may be a method where the reduced performance level of the active rear steering system comprises a stepped reduction of gain to a jerk component level, an acceleration component level, a velocity component level, and a rear rack displacement component level.

Another aspect of the disclosure may include a system for power management in an active rear steering system in a vehicle including a vehicle configured with an active rear steering system where the active rear steering system includes a rack motor configured to effectuate an angle of rear wheel steering. The system may also include a controller configured to generate control commands to the active rear steering system based on a state of charge of a vehicle battery derived from a voltage level of the vehicle battery where the controller may also enable a full performance level of the active rear steering system when the voltage level of the vehicle battery is greater than a first threshold level. The controller may also degrade the full performance level of the active rear steering system to a reduced performance level of the active rear steering system when the voltage level of the vehicle battery is less than the first threshold level but greater than a second threshold level, where the controller may also disable the performance level of the active rear steering system when the voltage level of the vehicle battery is less than the second threshold level.

Another aspect of the system may include where the controller may determine a voltage level of the vehicle battery, a voltage gradient level of the vehicle battery, and a rear rack force of the active rear steering system to determine a level of the reduced performance level of the active rear steering system.

Another aspect of the system may include where the reduced performance level of the active rear steering system is determined by an output performance level of the active rear steering system that includes a rack motor jerk value, a rack motor acceleration value, a rack motor velocity value, and a rack motor displacement position.

Another aspect of the system may include where the voltage level of the vehicle battery is less than the first threshold level, and the voltage gradient is decreasing, and the rear rack force is less than a first rear rack force threshold level, then the rack motor jerk value is reduced.

Another aspect of the system may include where when the voltage level of the vehicle battery is less than the first threshold level, and the voltage gradient is decreasing, and the rear rack force is greater than a second rear rack force threshold level but less than a third rear rack force threshold, then the rack motor jerk value is reduced and the rack motor acceleration value is reduced.

Another aspect of the system may include where when the voltage level of the vehicle battery is less than the first threshold level, and the voltage gradient is decreasing, and the rear rack force is greater than a third rear rack force threshold level, then the rack motor jerk value is reduced and the rack motor acceleration value is reduced and the rack motor velocity value is reduced and the rack motor displacement position is reduced.

Another aspect of the system may include where the controller is configured to limit commands to output an S-curve motion profile to a rear steering motor when degrading the full performance level of the active rear steering system to the reduced performance level.

Another aspect of the disclosure may include a method for power management in an active rear steering system in a vehicle that may include determining a state of charge of a vehicle battery based on a voltage level of the vehicle battery and also enabling a full performance level of the active rear steering system when the voltage level of the vehicle battery is greater than a first threshold level. The method may include degrading the full performance level of the active rear steering system to a reduced performance level of the active rear steering system when the voltage level of the vehicle battery is less than the first threshold level but greater than a second threshold level. The method may also include disabling the performance level of the active rear steering system when the voltage level of the vehicle battery is less than the second threshold level and also determining a voltage level of the vehicle battery, a voltage gradient level of the vehicle battery, and a rear rack force of the active rear steering system to determine a level of the reduced performance level of the active rear steering system, where the reduced performance level of the active rear steering system is determined by an output performance level of the active rear steering system that includes a jerk component level, an acceleration component level, a velocity component level, and a rear rack displacement component level. The method may also include where when the voltage level of the vehicle battery is less than the first threshold level, and the voltage gradient is decreasing, and the rear rack force is less than a first rear rack force threshold level, then the jerk component level is reduced and also where when the voltage level of the vehicle battery is less than the first threshold level, and the voltage gradient is decreasing, and the rear rack force is greater than a second rear rack force threshold level but less than a third rear rack force threshold level, then the jerk component level is reduced and the acceleration component level is reduced. The method may also include where when the voltage level of the vehicle battery is less than the first threshold level, and the voltage gradient is decreasing, and the rear rack force is greater than a third rear rack force threshold level, then the jerk component level is reduced and the acceleration component level is reduced and the velocity component level is reduced and the displacement component level is reduced. The method may also include where when the voltage level of the vehicle battery is less than the second threshold level, then the jerk component level is set to zero and the acceleration component level is set to zero and the velocity component level is set to zero and the displacement component level is set to zero, and where the degrading the full performance level of the active rear steering system to the reduced performance level comprises utilizing a controller to limit commands to output an S-curve motion profile to a rear steering motor.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 5 is an algorithm for active rear steering control based on voltage, voltage gradient, and rear rack force, in accordance with the disclosure.

Figure 1:
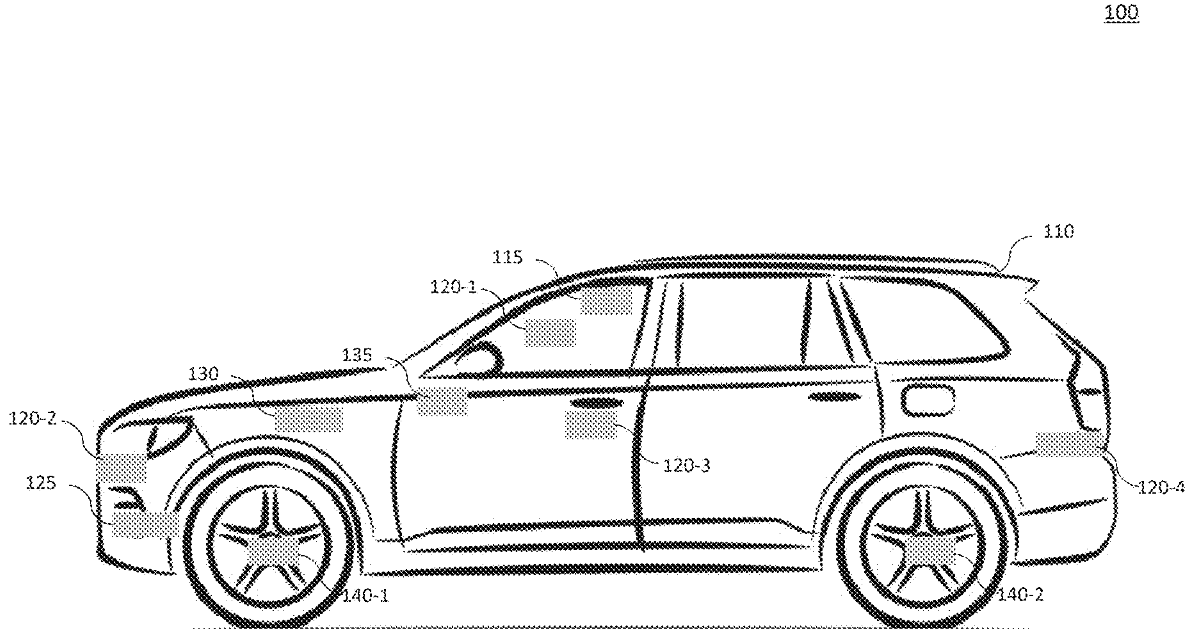
FIG. 1 is an illustration of a variety of possible vehicle sensors, in accordance with the disclosure.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible to embodiments in many different forms. Representative examples of the dis- 'closure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 3:
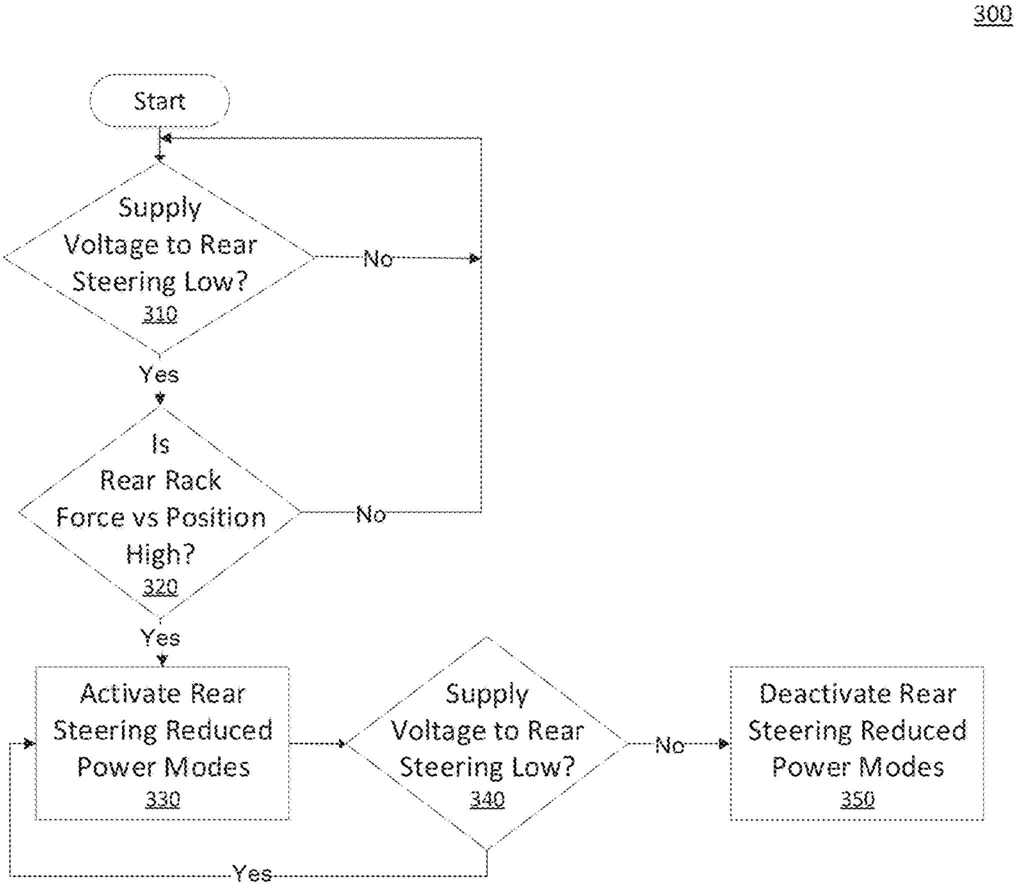
FIG. 3 is a flowchart of steps involved in controlling active rear steering based on supply voltages, in accordance with the disclosure.

Referring to the drawings, the leftmost digit of a reference number identifies the drawing in which the reference number first appears (e.g., a reference number '310' indicates that the element so numbered is first labeled or first appears in FIG. 3). Additionally, elements which have the same reference number, followed by a different letter of the alphabet or other distinctive marking (e.g., an apostrophe), indicate elements which may be the same in structure, operation, or form but may be identified as being in different locations in space or recurring at different points in time (e.g., reference numbers "110_a_" and "110_b_" may indicate two different input devices which may be functionally the same, but may be located at different points in a simulation arena).

Vehicles have become computationally advanced and equipped with multiple microcontrollers, cameras, sensors, processors, and control systems, including for example, active rear steering, autonomous vehicle and advanced driver assistance systems (AV/ADAS) such as adaptive cruise control, automated parking, automatic brake hold, automatic braking, evasive steering assist, lane keeping assist, adaptive headlights, backup assist, blind spot detection, cross traffic alert, local hazard alert, and automatic braking that may depend on information obtained from cameras and sensors on a vehicle. Such information may be used to more efficiently control various functions within the vehicle, where this disclosure illustrates the use of active rear steering.

FIG. 1 is an illustration of a vehicle with integrated sensors 100, according to an embodiment of the present disclosure. Such sensors may assist in the use of automated functions, such as autonomous driving and, as discussed, the ability to initiate and assist or automate a collision avoidance maneuver. For example, vehicle 110 may include a Light Detection And Ranging (Lidar) sensor 115, an inward or outward camera sensor 120 (as shown collectively by camera sensor 120-1-120-4), an ultrasonic sensor 125, an inertial measurement unit (IMU) sensor 130, a steering angle sensor 135, and wheel speed sensors 140-1 and 140-2, to name a few. Camera sensor 120 may also include multiple camera sensors placed around and throughout the vehicle, for example, camera sensor 120-1 mounted by the windshield facing forward, camera sensor 120-2 located at the front of the vehicle, facing forward, camera sensor 120-3 located at the left-side of the vehicle (with another side mounted camera sensor located at the right-side of the vehicle (not shown)), and camera-sensor 120-4 located at the rear of the vehicle. Other additional cameras and sensors at other locations may also be possible to provide additional views and/or operations.

Images from camera sensors 120 may detect one or more obstacles, especially obstacles that may not be visible by a driver, for example low posts, high curbs, etc. Processors within the vehicle may determine that there is a potential collision between the vehicle and a detected obstacle. The obstacle may also be another vehicle, a pedestrian, or other moving or stationary object. Surround sensing, such as ultrasonics, Lidar, and various types of cameras may be used to detect objects in a three-hundred-sixty-degree perimeter around the vehicle.

Further, processors within the vehicle may be used to determine a path of the vehicle and the potential for a collision with an obstacle. In addition, the processors may also determine if the obstacle may be avoided through the use of active rear steering, or a combination of active rear steering and adjusted front steering. However, typically active rear steering may default to an anti-phase position, for example when the front steering is angled to the right the left steering will be angled to the left in a proportional amount. For example, at a 6:1 ratio the front angle if set to 30 degrees would set the rear angle to a 5-degree offset. The given proportional examples are merely examples to convey an idea and not meant to be limiting.

Figure 2:
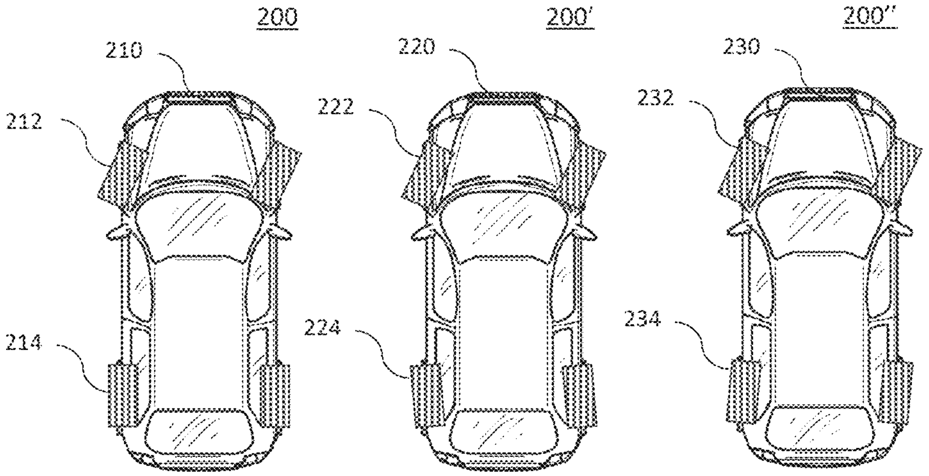
FIG. 2 is an illustration of various positions of a vehicle's rear wheels equipped with active rear steering, in accordance with the disclosure.

FIG. 2 illustrates three examples of front and rear steering positioning, according to an embodiment of the present disclosure. For example, configuration 200 illustrates vehicle 210 with front wheels 212 angled 25 degrees to the right with the rear wheels 214 at a zero-degree offset. Configuration 200 may represent a vehicle that is not equipped with active rear steering, or with active rear steering at a zero-degree offset. Configuration 200' illustrates vehicle 220 with front wheels 222 angled 25 degrees to the right with the rear wheels 224 at a five-degree offset to the left. For this disclosure when the front wheels are angled in one direction and the rear wheels are angled in the opposite direction, for example from wheels angled to the right with the rear wheels angled to the left, such a relationship may be referred to as being in anti-phase to each other. In contrast, configuration 200" illustrates vehicle 230 with front wheels 232 angled twenty-five degrees to the right with the rear wheels 234 at a five-degree offset to the right, e.g., in-phase. Further, the proportional 5:1 relationship between front and rear wheel relationships shown in configuration 200' and 200" are just examples and may consist of other values without deviating from the scope of this disclosure.

While active rear steering may be beneficial in the operation of a vehicle, active rear steering may require fairly large amounts of electrical current to function. Thus, FIG. 3 illustrates a flowchart of a method 300 of steps that may be used to monitor and control an active rear steering system, according to an embodiment of the present disclosure. Method 300 starts with monitoring the supply voltage to the active rear steering system. In an embodiment, the active rear steering system may utilize an electric motor to move a cylinder or rack to position the steering angle of the rear wheels. At step 310 a determination may be made as to whether a supply voltage to the active rear steering system is below a particular threshold. If not, then the method may continue to monitor the supply voltage at step 310. If a determination is made that the supply voltage is below the threshold level then at step 320 a further determination may be made as to whether the force on the active rear steering system, given its position, for example at the extreme end position of the rack, e.g., the maximum turn angle, is high or above a threshold limit. If the force on the steering system is below the threshold level, then the method may continue back to step 310 to monitor the supply voltage and subsequently to also monitor the rear rack force for its given position. However, if, at step 320, the rear rack force for its position is above a certain threshold then the method may continue to step 330 where the active rear steering system may be derated to a reduced, but not deactivated, power mode. As will be further discussed, a reduced power mode may include a reduction of the full linear range of the rear rack and/or a reduction of the gain values to the displacement position of the rack, e.g., for example in millimeters (mm), its velocity, e.g., for example in millimeters per second (mm/s), its acceleration, e.g., for example in millimeters per second per second ($mm/s^2$), and its jerk, e.g., for example in millimeters per second per second per second ($mm/s^3$). A reduced power mode may also include inhibiting rear steering modes and display a driver alert. After the active rear steering system has been derated to a reduced power mode the method may continue to step 340 in which the supply voltage to the active rear steering system may be further monitored to ascertain if the supply voltage is still below the threshold value. If the supply voltage continues to be below the threshold level, then the active rear steering system may continue in a reduced power mode in step 330. However, if the supply voltage level increases above the threshold level, then at step 350 the reduced power mode may be deactivated.

Figure 4:
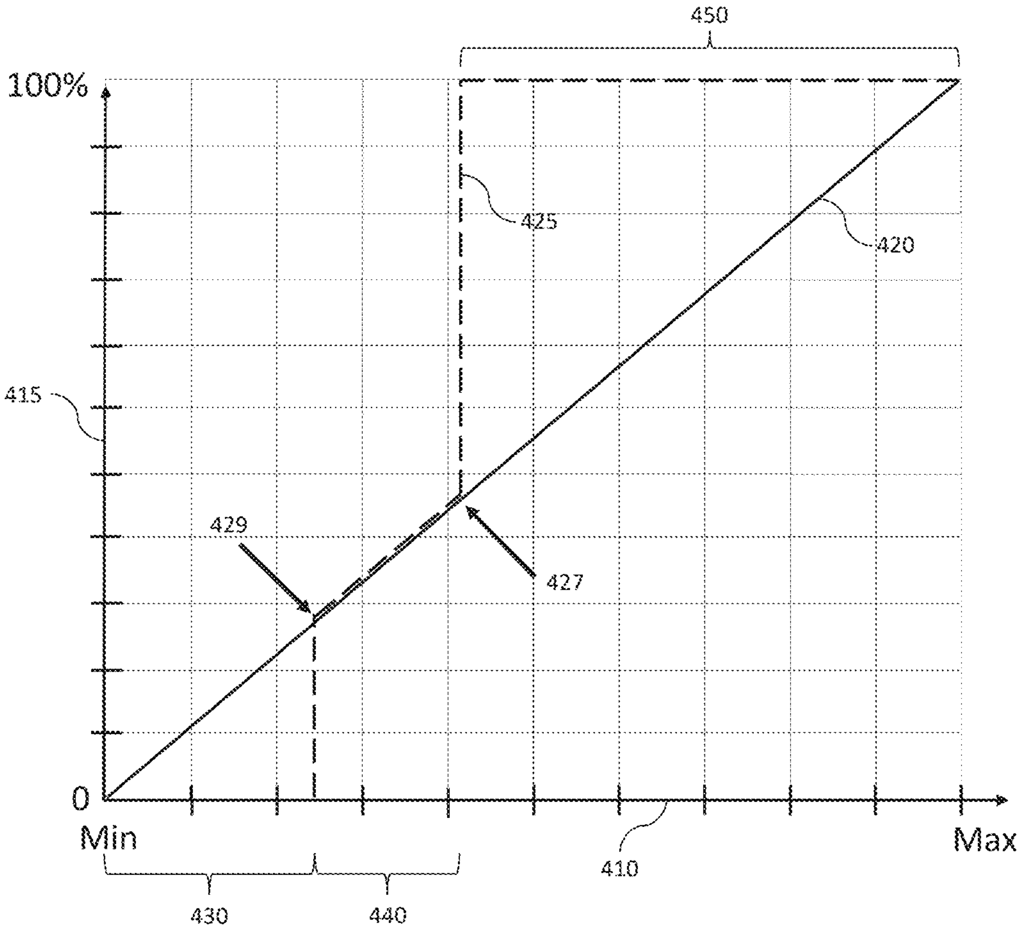
FIG. 4 illustrates the performance levels of active rear steering based on a state of charge of a battery, in accordance with the disclosure.

FIG. 4 illustrates an example of performance levels of active rear steering based on a state of charge of a battery, according to an embodiment of the present disclosure. FIG. 4 illustrates a voltage level on the horizontal axis 410 and graphed as minimum to maximum with a vertical axis 415 graphed as zero to 100 percent. Thus, a level of battery state of charge (SOC) 420 and a level of active rear steering function 425 are shown based on the battery voltage level shown on the horizontal axis.

Further, as the voltage level of various vehicles may vary, for example, from 12 volts to over 400 volts, the horizontal axis 410 in graph in FIG. 4 is not limited to a specific vehicle battery voltage range, but rather indicates a relative voltage level. For example, in an embodiment the maximum voltage may be 12 volts while the minimum voltage level may be 6 volts.

A vehicle battery, through use, may be degraded and present a low SOC. In such a situation, non-critical systems, for example an active rear steering system, may demand a relatively high current draw to meet the required system performance. For example, during high rack load and/or high rack velocity situations. To detect and counteract such a situation, this disclosure presents systems and algorithms to determine how an active rear steering system may manage power consumption to limit its battery current draw and ultimately preserve the battery SOC during low battery voltage situations. This process may be achieved by determining the magnitude of tie rod forces where during a low battery voltage situation, the active rear steering system may manage its power consumption by entering a reduced power mode to proactively reduce its current draw. Such a strategy may preserve the battery's SOC for other system use while still providing operation when most needed.

FIG. 4 illustrates a possible strategy where, when the battery's SOC is, for example at 100%, the level of active rear steering function 425 is also at a 100% level. However, as the battery SOC 420 declines the level of active rear steering function 425 continues to maintain a full 100% level, until a certain threshold level of SOC is reached. Therefore, during period 450 the level of active rear steering function 425 may be maintained at a full 100% level of functionality. However, when the battery SOC 420 drops below a certain threshold, the level of active rear steering function 425 may decrease from the full 100% level to a reduced level. As the level of battery SOC 420 continues to decrease the level of active rear steering function 425 may enter into a reduced function state, for example a linear decrease in the level of functionality as shown during period 440, starting when the battery SOC drops to point 427. Then, when the battery SOC 420 decreases to a second threshold, shown at when the battery SOC drops to point 429, the active rear steering function 425 is disabled and drops to a 0% level of functionality as shown during period 430. The reduced level of active rear steering function 425 during period 440 is shown in FIG. 4 as a linear reduction but may also be a stepped reduction or another variation of reduced performance prior to being disabled. The reduced performance level of active rear steering function 425 may be accomplished from one or more different methods. For example, the reduced performance may be accomplished by a linear reduction of gain to the active rear steering system jerk, acceleration, velocity, and displacement components. The reduced performance may also be accomplished by a linear reduction of torque command gain to the active rear steering system, or a linear reduction of torque maximum allowed in the active rear steering system. And as previously mentioned, instead of a linear reduction, a stepped reduction to one or more of the jerk, acceleration, velocity, or displacement components may also be used during the reduced performance period.

FIG. 5 illustrates an example of an algorithm 500 that utilizes rear steering rack force, existing front steering sensors, and the supply voltage to proactively manage the amount of power the active rear steering system may consume, according to an embodiment of the present disclosure. Algorithm 500 may also monitor the decreasing rate of supply voltage and SOC information over a defined period of time to determine a derating operation for rear steering power output. The supply voltage and SOC algorithm 500 references may be applied for the battery system, for example a 12V, 48V, or high voltage 400/800V system. Algorithm 500 may modify the rear steering position command profiles for motor jerk, motor acceleration, motor velocity, or motor position. Such actions may also be achieved by using a controller to limit the commands to output an S-curve motion profile, as will be shown in FIG. 6 and FIG. 8A, that depends on the conditions of supply voltage, SOC, and rear steering rack force. The gain reduction method of the controller may utilize a feedforward control that includes a low pass filter, or a feedback control the includes a proportional-integral-derivative (PID) loop tuning.

Accordingly, FIG. 5 shows that when the voltage level and a voltage gradient level of the battery system are at nominal levels, that with a rear rack force the output performance of the active rear steering system in terms of its ability for jerk, acceleration, velocity are at its normal levels with the ability to provide maximum displacement. However, when the battery input voltage to the active rear steering system is low and the voltage gradient is decreasing, for example as shown in FIG. 4 at point 427—and when force on the rear rack is low, then the jerk force output of the active rear steering is reduced, while maintaining normal acceleration and velocity outputs and with maximum rack displacement allowed.

Then, when the battery input voltage to the active rear steering system is low, the voltage gradient is decreasing—and when force on the rear rack is normal, then the jerk force output and the acceleration level of the active rear steering are both reduced, while maintaining normal velocity output and with maximum rack displacement allowed. Further, when the battery input voltage to the active rear steering system is low, the voltage gradient is decreasing—and when force on the rear rack is high, then the jerk force output, the acceleration level, and the velocity of the active rear steering are reduced, while also reducing the allowable rack displacement. Then, when the battery SOC reaches an under-voltage threshold with a continued decreasing voltage gradient, for example as shown in FIG. 4 at point 429, the active rear system is disabled with zero amounts of jerk, acceleration, velocity, and displacement output.

Figure 6:
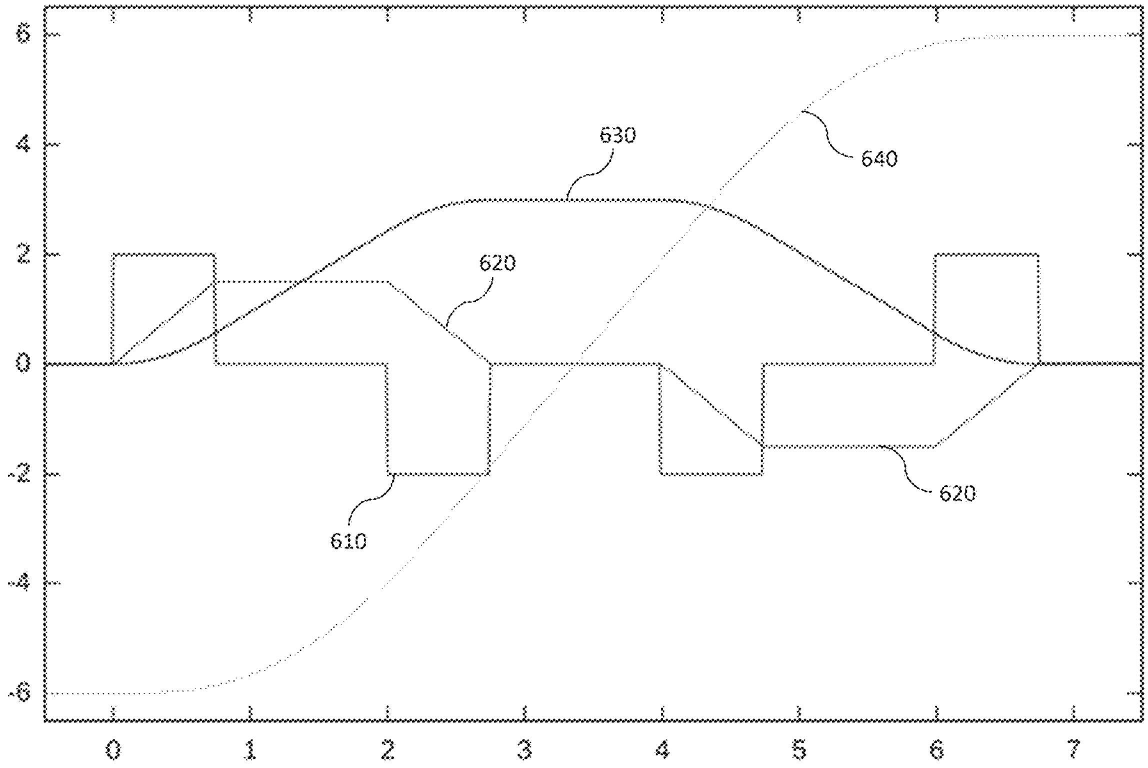
FIG. 6 presents a comparison of the relationships between jerk, acceleration, velocity, and displacement in an active rear steering system, in accordance with the disclosure.

FIG. 6 is an illustration of the possible relationships between jerk, acceleration, velocity, and displacement, according to an embodiment of the present disclosure. Time is shown on the horizontal axis with magnitude shown on the vertical axis with "0" being the middle neutral position. In an embodiment, at time zero the active rear steering system receives a command to jerk in a positive direction to position 2 as shown in jerk action line 610. In response to the jerk action the rack starts accelerating as shown in the acceleration line 620 that illustrates an increase in the acceleration in the positive direction starting at time zero through to about time 0.75 at which point the acceleration plateaus through to approximately time two.

In addition, in reaction to the jerk and acceleration forces, the velocity of the rack is shown in velocity line 630. Note that the velocity starts increasing, in a positive direction at time zero, increasing through approximately time 2.25 at which point the velocity stabilizes at a magnitude of approximately 3. Further, these forces may result in a change in displacement of the rack as shown by displacement line 640. In this example, the rack is initially stationed at the negative six position and gradually starts moving from the negative six position, through the neutral zero position at approximately a 3.4-time mark and then continues into a positive position, ending at a displacement of positive six.

Further, note that the negative jerk at approximately the 2-time mark results in a decrease in acceleration to zero and a decrease in velocity to a constant level. Also note that an additional negative jerk at approximately the 4-time mark results in a deceleration and a decrease in velocity. A fourth positive jerk action at the 6-time mark initiates a stop in the deceleration and velocity back to a zero magnitude.

Figure 7A:
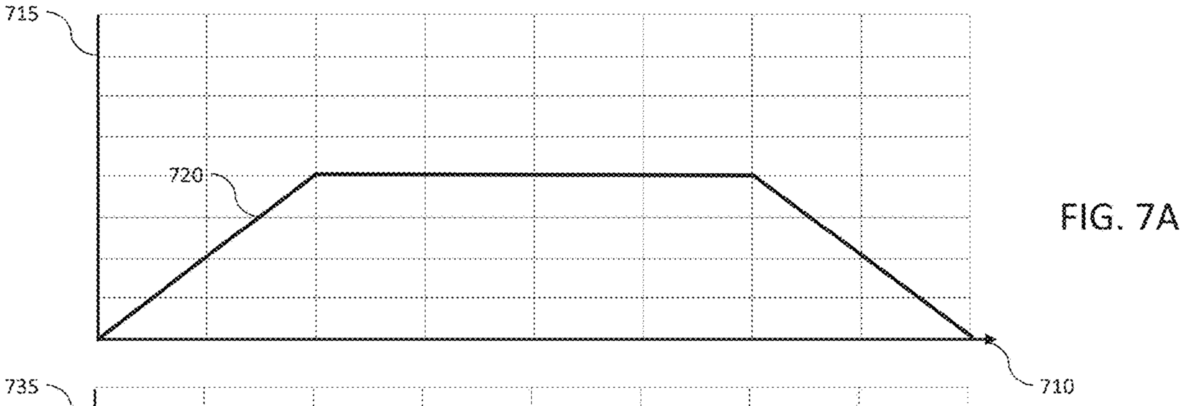
FIGS. 7A and 7B are illustrations of jerk, acceleration, and velocity of an active rear steering system, in accordance with the disclosure.
Figure 7B:
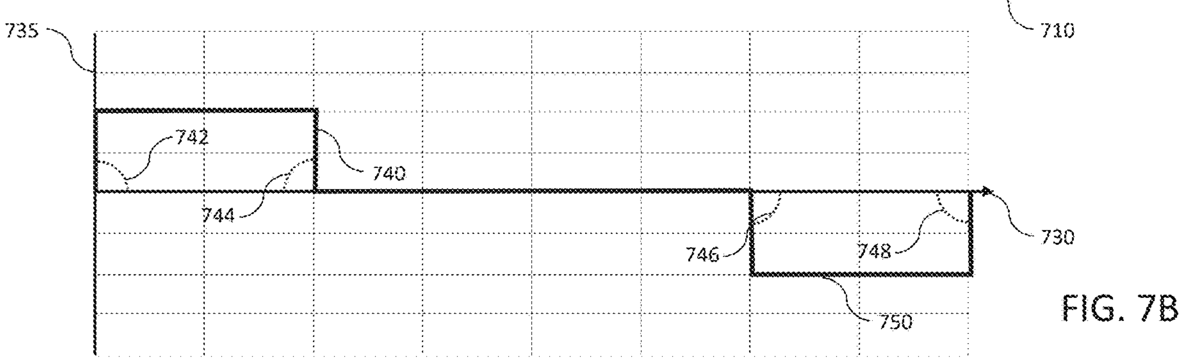
Figure 8A:
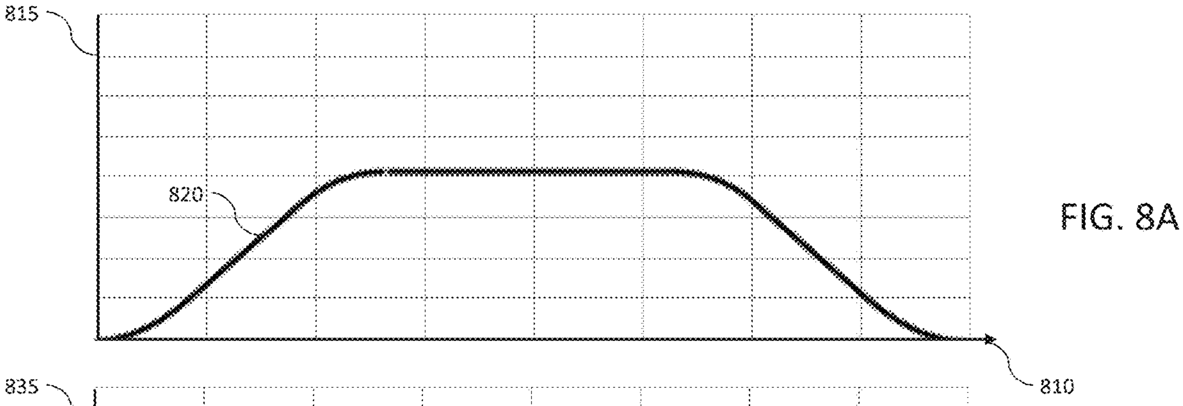
FIGS. 8A and 8B are illustrations of jerk, acceleration, and velocity of a derated active rear steering system, in accordance with the disclosure.
Figure 8B:
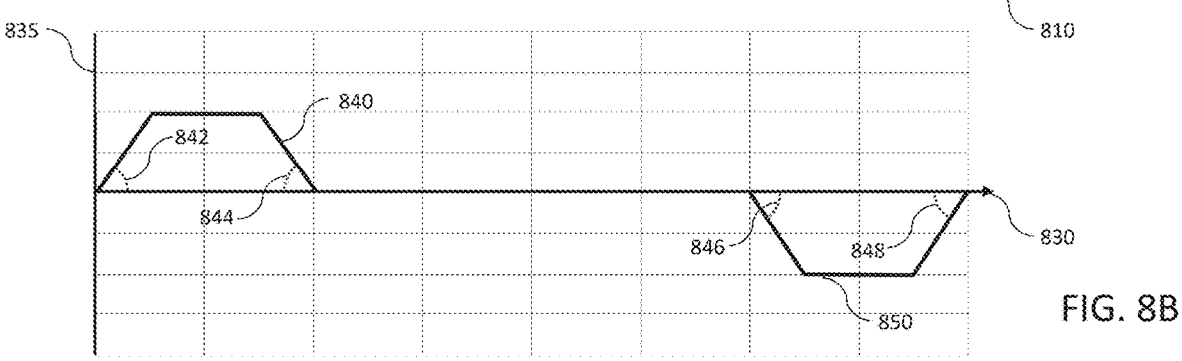

FIG. 7A and FIG. 7B illustrate examples of normal jerk commands and the resulting velocity, according to an embodiment of the present disclosure. FIG. 8A and FIG. 8B illustrate examples of a filtered command of a reduced jerk and the resulting velocity, according to an embodiment of the present disclosure. Starting with FIG. 7A and FIG. 7B, FIG. 7A illustrates time on the horizontal axis 710 versus velocity on the vertical axis 715. FIG. 7B illustrates time on the horizontal axis 730 versus acceleration/deceleration on the vertical axis 735. FIG. 7B represents a normal command for an acceleration jerk action with an initial jerk 740 including an instantaneous acceleration component shown as a ninety-degree angle 742. The normal jerk command results in a trapezoidal velocity component 720 with an inclination of approximately 45 degrees which may continue until the falling edge of the jerk 740 command, again represented as an instantaneous deceleration component shown as a ninety-degree angle 744. The velocity may remain constant until the issuance of a deceleration jerk action including an instantaneous deceleration component shown as a ninety-degree angle 746. This second normal jerk command results in the trailing edge of the trapezoidal velocity component 720 with a declination of approximately 45 degrees which may continue until the rising edge of the jerk 750 command, represented as an instantaneous acceleration component shown as a ninety-degree angle 748. The use of the saw-tooth jerk actions with near instantaneous changes may result in large current draw requirements from the active rear steering system.

FIG. 8A and FIG. 8B addresses this large current draw requirement of the active rear steering system by derating the jerk action, according to an embodiment of the present disclosure. FIG. 8A illustrates velocity versus time with time on the horizontal axis 810 versus velocity on the vertical axis 815. FIG. 8B illustrates time on the horizontal axis 830 versus acceleration/deceleration on the vertical axis 835. FIG. 8B represents a derated command for an acceleration jerk action with an initial jerk 840 including a derated ramped acceleration component shown as less than ninety-degree angle at angle 842. This derated jerk command results in a S-curve velocity component 820 with a gradual increase in velocity until plateauing and at approximately the derated falling edge of the jerk 840 command, again represented as derated deceleration component shown at less than ninety-degree angle at angle 844. The velocity may remain constant until the issuance of a derated deceleration jerk action. This second derated jerk command results in the trailing edge of the S-curve velocity component 820 which starts decreasing with the falling edge of the derated jerk 850 command, represented as derated deceleration component shown at less than a ninety-degree angle at angle 846 and continuing until the rising edge of the derated jerk 850 command, represented as derated acceleration component shown at less than a ninety-degree angle at angle 848.

The process of derating the jerk component of the active rear steering system may also be applied to the acceleration and velocity components. Further, the reduction of each gain may also reduce the sharpness of the integrated signals. In addition, each gain reduction for jerk, acceleration, velocity, and displacement may also be achieved by specific PID loop tuning. Filters may also be reduced in various frequency steps, for example, using a low pass filter of 20, 10, and 5 Hz. In an embodiment, when the displacement is reduced, the maximum position may also be limited until a final position of zero angle is achieved.

Figure 9:
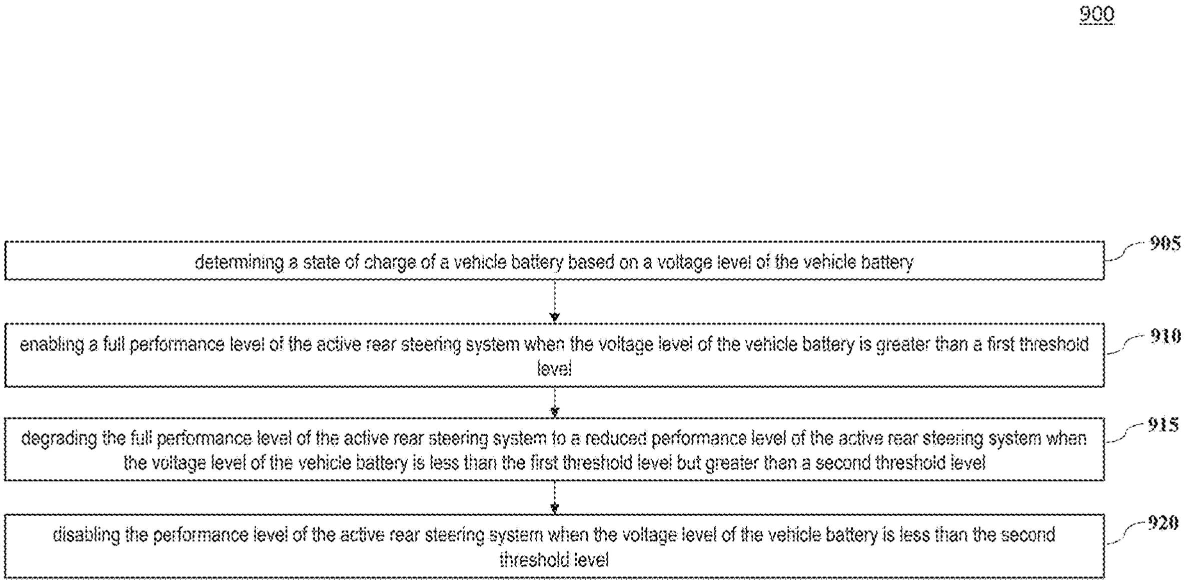
FIG. 9 depicts a method for power management in an active rear steering system in a vehicle, in accordance with the disclosure.

FIG. 9 illustrates method 900, according to an embodiment of the present disclosure. Method 900 may begin with step 905 by determining a state of charge of a vehicle battery based on a voltage level of the vehicle battery. As discussed in FIG. 4, the performance levels of an active rear steering system may be based on a state of charge of a battery. Further, a vehicle battery, through use, may be degraded and present a low SOC and in some situations an active rear steering system, may demand a relatively high current draw to meet the required system performance. For example, during high rack load and/or high rack velocity situations. To detect and counteract such a situation, this disclosure presents systems and algorithms to determine how an active rear steering system may manage power consumption to limit its battery current draw and ultimately preserve the battery SOC during low battery voltage situations.

At step 910 the method may include enabling a full performance level of the active rear steering system when the voltage level of the vehicle battery is greater than a first threshold level. As discussed in FIG. 3 and FIG. 4, different threshold levels for the battery SOC may be determined where if the battery SOC is above a first threshold, for example threshold point 427, then the active rear steering system may provide full performance, as detailed in FIG. 5 where the battery voltage and voltage gradient are nominal.

However, as described in step 915, the method may include degrading the full performance level of the active rear steering system to a reduced performance level of the active rear steering system when the voltage level of the vehicle battery is less than the first threshold level but greater than a second threshold level. As described in FIG. 3 and FIG. 4, there may be multiple derating actions that may be taken during a reduced performance period, as indicated in FIG. 4, when the battery SOC is between points 427 and 429. As further discussed in FIG. 5, when the battery input voltage to the active rear steering system is low and the voltage gradient is decreasing, for example as shown in FIG. 4 at point 427—and when force on the rear rack is low, then the jerk force output of the active rear steering is reduced, while maintaining normal acceleration and velocity outputs and with maximum rack displacement allowed. Further, when the battery input voltage to the active rear steering system is low, the voltage gradient is decreasing—and when force on the rear rack is normal, then the jerk force output and the acceleration level of the active rear steering are both reduced, while maintaining normal velocity output and with maximum rack displacement allowed. And, when the battery input voltage to the active rear steering system is low, the voltage gradient is decreasing—and when force on the rear rack is high, then the jerk force output, the acceleration level, and the velocity of the active rear steering are reduced, while also reducing the allowable rack displacement.

At step 920 the method may include disabling the performance level of the active rear steering system when the voltage level of the vehicle battery is less than the second threshold level. As discussed in FIG. 4, when the battery SOC falls below the point 429, the active rear steering system may be deactivated with zero amounts of jerk, acceleration, velocity, and displacement output.

Method 900 may then end.

The description and abstract sections may set forth one or more embodiments of the present disclosure as contemplated by the inventor(s), and thus, are not intended to limit the present disclosure and the appended claims.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof may be appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by the above-described exemplary embodiments.

Exemplary embodiments of the present disclosure have been presented. The disclosure is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosure.

What is claimed is:

1. A method of operating an active rear steering system in a vehicle, the active rear steering system including an electric rack motor configured to move a rear rack to steer a rear wheel of the vehicle, the method comprising:

determining, via a controller of the vehicle, a voltage level of a vehicle battery of the vehicle;

determining, via the controller, a state of charge of the vehicle battery based on the voltage level of the vehicle battery;

enabling, via the controller, a full performance level of the active rear steering system responsive to the voltage level of the vehicle battery being greater than a first threshold level;

determining an output performance level of the active rear steering system based on a rack displacement component level of the rear rack and a motor jerk component level, a motor acceleration component level, and a motor velocity component level of the electric rack motor;

determining, via the vehicle controller, a reduced performance level of the active rear steering system based on the output performance level of the active rear steering system, a voltage gradient level of the vehicle battery, and a rear rack force of the rear rack;

degrading, via the controller, the full performance level of the active rear steering system to the reduced performance level of the active rear steering system responsive to the voltage level of the vehicle battery being less than the first threshold level but greater than a second threshold level; and disabling, via the controller, the active rear steering system responsive to the voltage level of the vehicle battery being less than the second threshold level.

2. The method of claim 1, wherein degrading the full performance level to the reduced performance level includes, in response to the voltage level of the vehicle battery being less than the first threshold level, the voltage gradient level decreasing, and the rear rack force being less than a first rear rack force threshold level, reducing the motor jerk component level.

3. The method of claim 2, wherein degrading the full performance level to the reduced performance level includes, in response to the voltage level of the vehicle battery being less than the first threshold level, the voltage gradient level decreasing, and the rear rack force being greater than a second rear rack force threshold level but less than a third rear rack force threshold level, reducing the motor jerk component level and the motor acceleration component level.

4. The method of claim 3, wherein degrading the full performance level to the reduced performance level includes, in response to the voltage level of the vehicle battery being less than the first threshold level, the voltage gradient level decreasing, and the rear rack force being greater than the third rear rack force threshold level, reducing the motor jerk component level, the motor acceleration component level, the motor velocity component level, and the rack displacement component level.

5. The method of claim 1, wherein disabling the active rear steering system includes, in response to the voltage level of the vehicle battery being less than the second threshold level, setting the motor jerk component level, the motor acceleration component level, the motor velocity component level, and the rack displacement component level to zero.

6. The method of claim 1, wherein the degrading the full performance level of the active rear steering system to the reduced performance level includes the controller of the vehicle limiting commands to output an S-curve motion profile to the electric rack motor of the active rear steering system.

7. The method of claim 1, wherein the reduced performance level of the active rear steering system comprises a linear reduction of gain to the motor jerk component level, the motor acceleration component level, the motor velocity component level, and the rack displacement component level.

8. The method of claim 1, wherein the reduced performance level of the active rear steering system comprises a linear reduction of a motor torque command gain of the electric rack motor.

9. The method of claim 1, wherein the reduced performance level of the active rear steering system comprises a linear reduction of a motor torque maximum of the electric rack motor.

10. The method of claim 1, wherein the reduced performance level of the active rear steering system comprises a stepped reduction of gain to the motor jerk component level, the motor acceleration component level, the motor velocity component level, and the rack displacement component level.

11. A motor vehicle, comprising:

a vehicle battery;

a plurality of vehicle wheels including a front wheel and a rear wheel;

an active rear steering system including a rear rack and an electric rack motor configured to move the rear rack and thereby effectuate a steering angle of the rear wheel; and a controller configured to generate control commands to the active rear steering system, the controller being programmed to;

determine a voltage level of the vehicle battery;

enable a full performance level of the active rear steering system responsive to the voltage level of the vehicle battery being greater than a first threshold level;

determine an output performance level of the active rear steering system based on a rack displacement component level of the rear rack and a motor jerk component level, a motor acceleration component level, and a motor velocity component level of the electric rack motor;

determine a reduced performance level of the active rear steering system based on the output performance level of the active rear steering system, a voltage gradient level of the vehicle battery, and a rear rack force of the rear rack;

degrade the full performance level of the active rear steering system to the reduced performance level of the active rear steering system responsive to the voltage level of the vehicle battery being less than the first threshold level but greater than a second threshold level; and disable the active rear steering system responsive to the voltage level of the vehicle battery being less than the second threshold level.

12. The motor vehicle of claim 11, wherein degrading the full performance level to the reduced performance level includes, in response to the voltage level of the vehicle battery being less than the first threshold level, the voltage gradient level decreasing, and the rear rack force being less than a first rear rack force threshold level, reducing the motor jerk component level of the electric rack motor.

13. The motor vehicle of claim 12, wherein degrading the full performance level to the reduced performance level includes, in response to the voltage level of the vehicle battery being less than the first threshold level, the voltage gradient level decreasing, and the rear rack force being greater than a second rear rack force threshold level but less than a third rear rack force threshold level, reducing the motor jerk component level and the motor acceleration component level.

14. The motor vehicle of claim 13, wherein degrading the full performance level to the reduced performance level includes, in response to the voltage level of the vehicle battery being less than the first threshold level, the voltage gradient level decreasing, and the rear rack force being greater than the third rear rack force threshold level, reducing the motor jerk component level, the motor acceleration component level, the motor velocity component level, and the rack displacement component level.

15. The motor vehicle of claim 11, wherein the controller limits commands to output an S-curve motion profile to the electric rack motor when degrading the full performance level of the active rear steering system to the reduced performance level.

16. A method of operating an active rear steering system in a vehicle, the active rear steering system including an electric rack motor configured to move a rear rack to steer a rear wheel of the vehicle, the method comprising:

determining, via a controller of the vehicle, a voltage level of the vehicle battery;

enabling, via the controller, a full performance level of the active rear steering system when the voltage level of the vehicle battery is greater than a first threshold level;

degrading, via the controller, the full performance level of the active rear steering system to a reduced performance level of the active rear steering system when the voltage level of the vehicle battery is less than the first threshold level but greater than a second threshold level;

disabling, via the controller, the active rear steering system when the voltage level of the vehicle battery is less than the second threshold level;

determining, via the controller, a voltage gradient level of the vehicle battery and a rear rack force of the rear rack of the active rear steering system; and determining, via the controller, a level of the reduced performance level of the active rear steering system based on the voltage level, the voltage gradient level, and the rear rack force, wherein the reduced performance level of the active rear steering system is determined by an output performance level of the active rear steering system that includes a motor jerk component level, a motor acceleration component level, a motor velocity component level, and a rear rack displacement component level, wherein when the voltage level of the vehicle battery is less than the first threshold level, the voltage gradient is decreasing, and the rear rack force is less than a first rear rack force threshold level, then the motor jerk component level is reduced, wherein when the voltage level of the vehicle battery is less than the first threshold level, the voltage gradient is decreasing, and the rear rack force is greater than a second rear rack force threshold level but less than a third rear rack force threshold level, then the motor jerk component level is reduced and the motor acceleration component level is reduced, wherein when the voltage level of the vehicle battery is less than the first threshold level, the voltage gradient is decreasing, and the rear rack force is greater than the third rear rack force threshold level, then the motor jerk component level is reduced and the motor acceleration component level is reduced and the motor velocity component level is reduced and the rear rack displacement component level is reduced, wherein when the voltage level of the vehicle battery is less than the second threshold level, then the motor jerk component level is set to zero and the motor acceleration component level is set to zero and the motor velocity component level is set to zero and the rear rack displacement component level is set to zero, and wherein the degrading the full performance level of the active rear steering system to the reduced performance level includes the controller limiting commands to output an S-curve motion profile to the electric rack motor.

17. The method of claim 1, further comprising:

monitoring a supply voltage to the active rear steering system;

determining the supply voltage to the active rear steering system is below a supply voltage threshold; and activating, responsive to the supply voltage being below the supply voltage threshold, a reduced power mode of the active rear steering system, the reduced power mode including a reduction of a full linear range of the rear rack.

18. The method of claim 17, further comprising determining, responsive to the supply voltage being below the supply voltage threshold, a rack force on the rear rack is above a rack force threshold, wherein activating the reduced power mode is further in response to the rack force being above the rack force threshold.

19. The method of claim 18, further comprising determining, responsive to the supply voltage being below the supply voltage threshold, the rear rack is at an extreme end position of the rear rack, wherein determining the rack force is at the extreme end position.

20. The method of claim 18, further comprising:

determining the supply voltage is above the supply voltage threshold; and deactivating, responsive to the supply voltage being above the supply voltage threshold, the reduced power mode.

* * * * *